MAGNETIC STORAGE AND COUNTING CIRCUITS

Filed May 13, 1955

INVENTORS
Vernon L. Newhouse
& Noah S. Prywes
BY
ATTORNEY.

United States Patent Office 2,953,775

Patented Sept. 20, 1960

2,953,775

MAGNETIC STORAGE AND COUNTING CIRCUITS

Vernon L. Newhouse, Moorestown, and Noah Shmarja Prywes, Pennsauken, N.J., assignors to Radio Corporation of America, a corporation of Delaware Filed May 13, 1955, Ser. No. 508,076

12 Claims. (Cl. 340—174)

This invention relates to magnetic systems, and more particularly to magnetic core systems of the shift register or counting type.

Certain magnetic core systems, for example, certain shift register circuits and counting circuits, are of the so-called "one core per bit" type. Each "bit" (that is, binary digit of information) is represented by one of two residual directions of magnetization of a core. A common shift line connecting all the shift windings in series may be employed for transferring a bit from one of the cores to the next higher order core in a shifting sequence. A temporary storage means, such as a capacitor, is generally provided for temporary storage of the bit read out of the one core until entered in a succeeding core. The capacitor connects an output winding of the one core to an input winding of the next higher order core. On application of a shift pulse to the shift line, the bit is read out of the one core and temporarily stored as a charge on the capacitor. Upon the termination of the shift pulse, the transfer of the bit is completed by the capacitor discharging through the input winding of the next higher order core to bring this next higher order core to the state corresponding to that of the transferred bit.

It is an object of the present invention to provide an improved shift register type circuit employing magnetic cores which requires fewer windings.

Another object of the present invention is to provide an improved magnetic system employing magnetic cores and useful for storing and shifting information, wherein each of the cores may be provided with only two windings.

Still another object of the present invention is to provide an improved counting circuit employing magnetic cores which requires fewer windings linking the cores, for transferring a signal from one core to another, than those required by prior counting circuits.

According to the invention, a magnetic system is provided with a plurality of cores all linked by a shift line. A transfer winding on one core is connected to a transfer winding of a succeeding core by means of a corresponding pair of transfer loops and a temporary storage means common to that pair. The storage means may be, for example, a capacitor. By these means, and by timed biasing means and unidirectional conducting means, the information may be transferred from core to core using only a single transfer winding linking each core.

Figure 1:
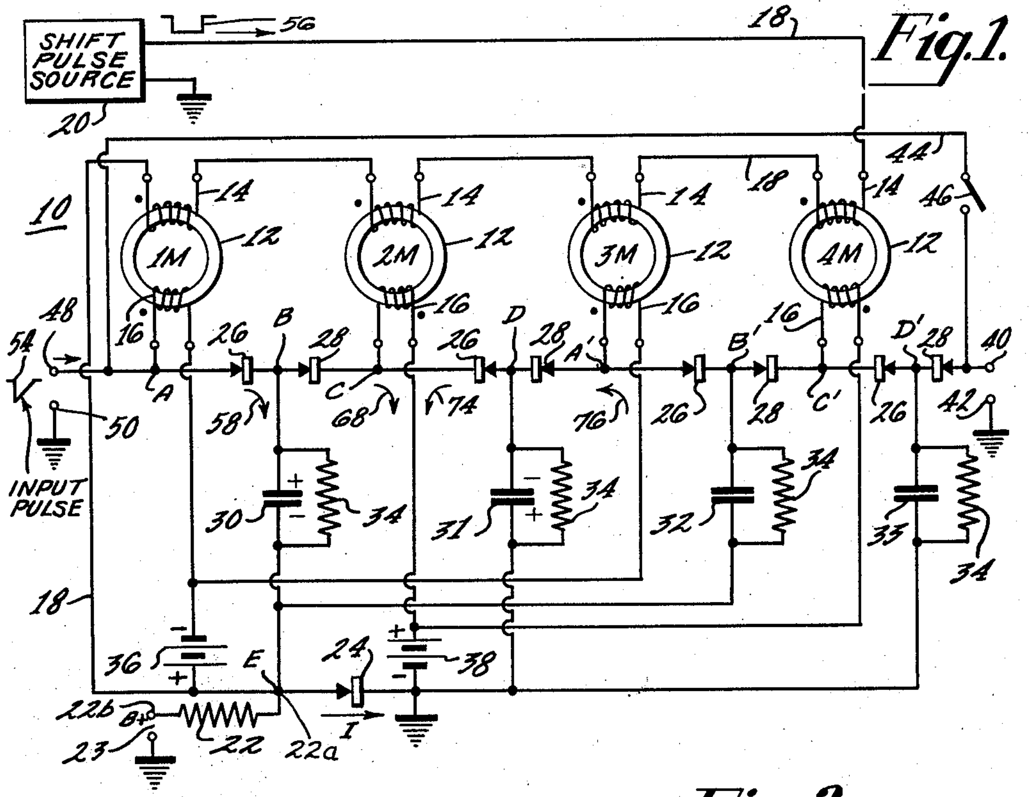
Figure 3:
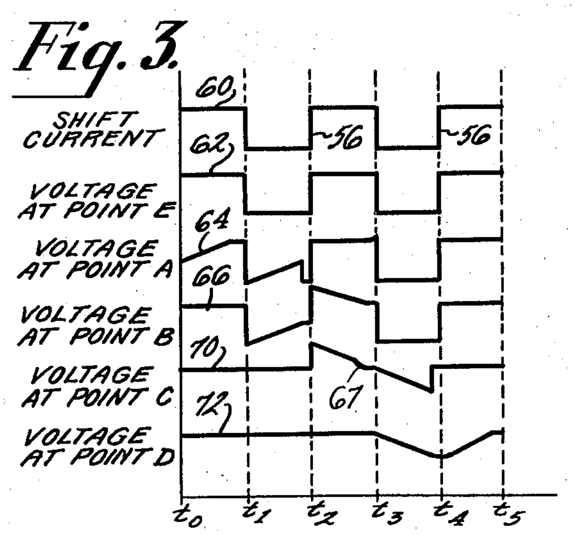
Figure 2:
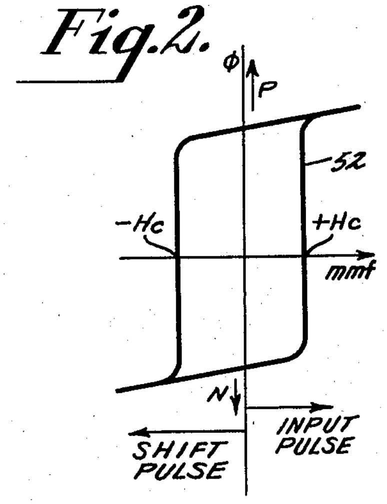

The novel features of the invention, as well as the invention itself, both as to its organization and method of operation, will best be understood from the following description, when read in connection with the accompanying drawing, in which:

Fig. 1 is a schematic diagram of a magnetic core system according to the invention, and useful in applications of the type employing shift registers or counters, Fig. 2 is a graph, somewhat idealized, of the hysteresis characteristic for a magnetic material which may be employed in practicing the present invention, and Fig. 3 shows graphs of waveforms, all on the same time scale, which are useful in explaining the operation of the circuit of Fig. 1.

The magnetic system 10 of Fig. 1, illustratively, is provided with four stages designated 1M through 4M, respectively. Each stage has a magnetic core 12 linked by a shift winding 14 and a transfer winding 16. Each winding has two terminals, one marked and the other unmarked, in accordance with the usual transformer convention more fully described hereinafter. All the shift windings 14 are connected in series, marked terminal to unmarked terminal, to form a shift line 18. The shift line 18 is connected at the unmarked terminal of the shift winding 14 of the stage 4M core 12 to a shift pulse source 20. The shift pulse source 20 has one terminal connected to a common bias source, indicated by the conventional ground symbol. The source 20 may be any conventional pulse source adapted to supply constant current pulses to the shift line 18. The shift line 18 is also connected at the marked terminal of the shift winding 14 of the stage 1M core 12 to the upper terminal 22*a* (as viewed in the drawing) of a bias resistor 22. The lower terminal 22*b* of the bias resistor 22 is connected to the B+ output of a conventional power supply 23. A priming diode 24 has an anode connected to the upper bias resistor terminal 22*a* and a cathode connected to ground.

A priming current I normally flows from the B+ terminal through the bias resistor 22 and in a forward direction through the priming diode 24 to ground.

One terminal, the marked or unmarked, of a transfer winding 16 of one core 12 is connected to the opposite terminal, the unmarked or the marked, respectively, of the transfer winding 16 of the next succeeding core 12 by means of a pair of series-connected unilateral conducting devices, such as the diode rectifiers 26, 28. The pair of diode rectifiers 26, 28 is connected to each other, cathode to anode; the remaining anode of a pair is connected to the marked terminal of one transfer winding and the remaining cathode of a pair is connected to the unmarked terminal of the other transfer winding. The polarities of the diode pairs alternately reverse between successive ones of the cores 12.

One of the capacitors 30 through 33 has one plate connected to a junction point between each pair of diodes 26, 28. The other plate of each even numbered capacitor 30 and 32 is connected to the upper terminal 22*a* of the bias resistor 22. The other plate of each odd numbered capacitor 31 and 33 is connected to ground.

A different resistor 34 is connected in shunt with each of the capacitors 30–33. Each resistor 34 has a relatively high resistance and serves to regulate the charge on each capacitor during quiescent operation.

The unmarked terminals of the stage 1M and 3M transfer windings 16 are connected in parallel to a negative terminal of a D.C. source, shown as a battery 36. The positive terminal of the battery 36 is connected to the upper terminal 22*a* of the bias resistor 22. The marked terminals of the stage 2M and 4M transfer windings 16 are connected in parallel to the positive terminal of a second D.C. source, shown as a battery 38. The negative terminal of the battery 38 is connected to ground. The batteries 36 and 38 are constant voltage sources which may be used for blocking or for "zero suppression" purposes, as described hereinafter.

A pair of output terminals 40 and 42 are provided. The output terminal 40 of the pair of output terminals 40 and 42 is connected to the anode of the diode 28 of the last pair of diodes 26, 28 following the stage 4M. The other output terminal 42 of the pair is connected to ground.

The system 10 is thus arranged in the manner of a shift register type circuit with the cores 12 being connected in cascade. After a predetermined number of shift pulses, determined by the number of stages in the register, information inserted in the stage 1M core 12 appears across the output terminals 40, 42. The output of the stage 4M core 12, however, may be fed back to the transfer winding 16 of the stage 1M core 12 by means of a feedback line 44 to form a ring-counting circuit. A single-pole, single-throw switch 46 may be connected in the feedback line 44. The switch 46 normally may be open. When it is desired to feed back the information from the stage 4M output to the stage 1M input, the switch 42 is closed. One input terminal 48 of a pair of input terminals is connected to the marked terminal of the stage 1M transfer winding 16. The other input terminal 50 is connected to ground.

Each core 12 may be made from a magnetic material having appreciable remanence and, preferably, from a material characterized by a substantially rectangular hysteresis loop. Certain metallic materials such as Molybdenum-Permalloy and certain ceramic materials such as Manganese-Magnesium ferrite exhibit the desired hysteretic characteristics. The hysteresis loop 53 of Fig. 2 illustrates a hysteresis loop, somewhat idealized, for a rectangular loop magnetic material. This loop is a plot of magnetic induction B against magnetizing force M.M.F.

The cores 12 used in practicing the invention may be toroidal in shape. Each core 12 has two directions of magnetization. One direction, arbitrarily designated the "P" direction, corresponds to a flux substantially oriented in one sense in a core 12; and the other direction, the "N" direction, corresponds to flux substantially oriented in the opposite sense in a core 12. In a toroidal core, for example, these senses may be taken along a circular line within the figure of revolution.

As indicated in Fig. 2, the direction of magnetization of a core can be changed from the N direction to the P direction by applying a magnetizing force greater than a coercive force $+Hc$ to the core; and from the P direction to the N direction by applying a magnetizing force greater than a coercive force $-Hc$ to the core. A positive magnetizing force is produced by applying a negative polarity current pulse to the marked terminal of a winding linking a core; and a negative magnetizing force is produced by applying a negative polarity pulse to the unmarked terminal of a winding linking the core. For example, in the circuit of Fig. 1, application of an input pulse 54 of sufficient amplitude to the marked terminal of the stage 1M transfer winding 16 produces a positive magnetizing force greater than a coercive force $+Hc$ in the stage 1M core 12. A negative shift pulse 56 applied to the unmarked terminal of each shift winding 14 produces a negative magnetizing force greater than a coercive force $-Hc$ in each core 12. A core already magnetized in the N direction is driven further into saturation in the N direction by a shift pulse 56.

Each time a flux change is produced in a core 12 by a current flowing in one winding, a voltage is induced across the terminals of any other winding linked thereto. The induced voltage is in a direction to make the other winding terminals more positive, or more negative, relative to each other in correspondence with the relative polarities of the terminals of the one winding.

In operation, assume that the shift register 10 is reset, for example, by applying a suitable pulse to a reset winding (not shown) which links each of the cores 12 in the same one sense so as to drive each core to the N direction of magnetization. The duration of a reset pulse is made sufficiently long so that any transient voltages caused by a flux change in one or more cores 12 are over-ridden by the reset pulse. Alternatively, all the cores 12 can be driven to the N direction by applying a suitable number of shift pulses 56 before an input pulse is written into the first stage 1M.

Assume now that a negative input pulse 54 is applied across the input terminals 48, 50. The input pulse 54 may be furnished by the output of a magnetic system similar to that of Fig. 1. Also other known constant current sources, such as a pentode type tube suitably arranged, may be used for an input pulse source. The current flowing into the marked terminal of the transfer winding 16 of the stage 1M core 12 drives this core to the P direction of magnetization. The diodes 26, 28 block any current flow in the first pair of transfer loops coupling the stages 1M and 2M. The first shift pulse 56 applied to the shift line 18 changes the magnetization of the stage 1M core 12 back to the N direction and drives each of the other cores 12 further into saturation in the N direction. The voltage induced across the terminals of the transfer winding 16 of the stage 1M core 12 causes a charging current to flow in the first transfer loop through the first diode 26 of the first loop in the direction of the arrow 58, thereby charging the first capacitor 30. The upper plate of the capacitor 30 is made positive and the lower plate is made negative relative to each other, as indicated by the plus and minus signs adjacent these plates, by the charging current.

The shift pulse 56 flows through the biasing resistor 22 and returns to the shift pulse source through the common ground connection. During the presence of the shift pulse 56 the upper terminal 22a of the biasing resistor 22, designated as the point E, is made negative relative to ground. Thus, each second transfer loop of each pair of loops coupling the respective stages is effectively open during the presence of the shift pulse 56 by having the anodes of the diodes 28 made negative relative to their cathodes.

The shifting of information from a lower to a higher order core can best be explained by referring to the idealized waveforms of Fig. 3. The first line of these waveforms represents a pair of shift pulses 56 and successive lines represent the resulting voltages at points E, A, B and C, respectively, of the first pair of transfer loops coupling the stages 1M and 2M in shifting a binary "one" down the line. The voltages are all indicated relative to their quiescent values. The waveform 60 of Fig. 3 represents a pair of shift pulses 56. The first shift pulse 56 is applied at a time $t_1$ and terminates at a time $t_2$; and the second shift pulse 56 is applied at a time $t_3$ and terminates at a time $t_4$. The waveform 62 represents the voltage $V_E$ at the point E from the time $t_0$ to the time $t_5$.

The waveform 64 represents the voltage $V_A$ at the point A, the marked terminal of the transfer winding 16 of the stage 1M core 12. The input pulse 54 is applied to the stage 1M core 12 transfer winding between the times $t_0$ and $t_1$. The voltage at the point A falls and rises in substantial correspondence with the input pulse 54. The input pulse 54 terminates just prior to the time $t_1$ at which time substantially all the flux in the stage 1M core 12 is oriented in the sense corresponding to the P direction of magnetization. At time $t_1$, the voltage at the point A is driven negative by the first shift pulse 56 and reaches a value approximately equal to that of the point E. This voltage gradually rises almost linearly due to the voltage induced across the terminals of the first transfer winding 16. The capacitor 30 is charged by the current flow produced in the first transfer loop, to a maximum value when all the flux change of the stage 1M core 12 is completed. The voltage at the point A then goes negative for the remainder of the shift pulse 56. Upon the termination of the shift pulse 56 the voltage at the point A returns to its initial value. Note that the voltage at the point A has two separate components, one due to the shift pulse 56, the other due to the voltage induced across the first transfer winding 16.

The waveform 66 of Fig. 3 represents the voltage $V_B$ at the point B, taken at the junction between the diodes 26 and 28 of the first pair of transfer loops between the times $t_0$ and $t_5$. At time $t_1$ the voltage at the point B is also driven negative by the shift pulse 56. As the capacitor 30 is charged by the current flow in the first transfer loop, the voltage at the point B rises in a linear fashion. When the flux change in the stage 1M core 12 is completed, the voltage at the point B stays at a steady value for the remainder of the shift pulse 56. At time $t_2$ when the first shift pulse 56 is terminated, the voltage at the point B rises sharply, by an amount equal to the shift pulse amplitude, to a positive value corresponding to the voltage across the capacitor 30. The voltage $V_B$ then decreases almost linearly during the discharge of the capacitor 30 and produces a current flow in the second transfer loop in the direction of the arrow 68. This current in the second transfer loop flows from the upper plate of the capacitor 30, through the second diode 28, the transfer winding 16 of the stage 2M core 12, through the battery 38, from its positive to its negative terminal, and through the priming diode 24 in a reverse direction back to the lower plate of the capacitor 30. The values of the bias resistor 22 and the B+ supply are adjusted to make the priming current I exceed by some small amount, say 10%, the sum of the currents produced due to the discharging of one or more of the capacitors. This relation may be expressed as, $$I=\frac{B+}{R}>nI_c \tag{1}$$

where B+ is the power supply voltage, R is the value of the bias resistor 22, $I_c$ is the current flowing in a second transfer loop, and $n$ is the largest number of capacitors discharging at any one time.

The positive current flow into the unmarked terminal of the transfer winding 16 of the stage 2M core 12 drives this core to the P direction of magnetization. Upon the completion of the flux change in the stage 2M core 12, the voltage at the point B decays rapidly and again reaches its initial value by the time $t_3$.

The waveform 70 represents the voltage $V_C$ at the point C, the unmarked terminal of the transfer winding 16 of the stage 2M core 12, between the times $t_0$ and $t_5$. At time $t_2$, the termination of the first shift pulse 56, the voltage at the point C rises to a positive value substantially equal to that of the point B. Then the voltage at the point C decays almost linearly until the flux change in the stage 2M core 12 is completed, and then the voltage drops rapidly, as shown by the dip 67 of the waveform 70, and returns to the initial value by the time $t_3$. The current flow into the unmarked terminal of the transfer winding 12 of the stage 2M core 12 drives this core to the P direction of magnetization.

The last line of Fig. 3 represents the voltage at the point D, the junction between the diodes 26 and 28 of the second pair of transfer loops coupling the stages 2M and 3M cores 12. The waveform 72 represents the voltage $V_D$ at the point D in shifting a binary "one" between the stages 2M and 3M cores 12 relative to a quiescent voltage. The voltage $V_D$ is substantially unchanged between the times $t_1$ and $t_3$ when the signal is shifted from the stage 1M core 12 to the stage 2M core 12.

At time $t_3$, a second shift pulse 56 is applied to the shift line 18 by the shift pulse source 20. Again the voltages at the points E, A and B are driven negative and remain at a constant value between the times $t_3$ and $t_4$, the duration of the second shift pulse 56. The second shift pulse 56 drives the stage 2M core 12 from the P to the N direction of magnetization. The voltage at the point C decreases almost linearly in a negative direction representing the induced voltage caused by the flux change in the stage 2M core 12. The resulting current flow in the first transfer loop of the second pair is indicated in Fig. 2 by the arrow 74. This current charges the second capacitor 31 so as to make its upper plate negative and its lower plate positive, as indicated in the drawing by the plus and minus signs adjacent these plates. In contrast, recall that the plates of the capacitor 30 of the previous pair of transfer loops were charged with the upper plate positive relative to the lower plate in reading the signal from the stage 1M core 12. When the flux change in the stage 2M core 12 is completed the voltage at the point C returns to its initial value. At time $t_3$, the voltage at the point D decreases almost linearly in a negative direction, while the capacitor 31 is being charged, and reaches a maximum negative value upon the completion of the flux change in the stage 2M core 12. The point D remains at its maximum negative value for the duration of the second shift pulse 56.

At time $t_4$, when the second shift pulse 56 is terminated, the second capacitor 31 begins discharging through the second transfer loop of the second pair of transfer loops, and produces a current in the direction of the arrow 76 in this second transfer loop. This current flows from the lower plate of the capacitor 31, through the priming diode 24, in a reverse direction, through the battery 36, from its positive to its negative terminal, through the transfer winding 16 of the stage 3M core 12, and through the diode 28 of the second pair of transfer loops back to the upper plate of the capacitor 31. The voltage at the point D begins to increase from the maximum negative value and returns to its initial value which obtained at the time $t_3$. The current flow into the unmarked terminal of the transfer winding 16 of the stage 3M core 12 drives this core to the P direction of magnetization.

Thus, the signal is transferred from the stage 2M core 12 to the stage 3M core 12. A subsequent shift pulse 56 then shifts the signal from the stage 3M core 12 to the stage 4M core 12 in the manner described for the stages 1M and 2M. The voltages at the points A′, B′, C′ and D′ of the remaining pairs of transfer loops change in a similar manner to that described for the points A, B, C and D. A third shift pulse 56 transfers the information from the stage 3M core 12 to the stage 4M core 12. A signal stored in the stage 4M core 12 appears across the output terminals 40, 42 after a fourth shift pulse 56 is applied.

At the time $t_3$, when the stage 2M core 12 is driven to the P direction of magnetization, a new input pulse 54 can be applied across the input terminals 48 and 50. This new input pulse again drives the stage 1M core 12 to the P direction of magnetization. A plurality of binary ones, each represented by the direction P of one of the cores 12, can be shifted along the line in the manner just described for a single binary one. Substantially no undesired interaction occurs in shifting a plurality of binary ones because each second transfer loop is open during the application of a shift pulse.

By completing the feedback circuit, as by closing the switch 46 of the feedback line 44, the signal stored in the stage 4M core 12 is fed back to the stage 1M core 12 to form a closed ring. The output of the stage 4M core 12 can also be fed back to the stage 3M core 12 by connecting the output terminal 40 to the marked terminal of the transfer winding 16 of the stage 3M core 12. In a shift register having a number "$n$" of the cores 12, the output of the $n$th core 12 can be fed back to the input of the $n$th−2 core 12, if desired.

The batteries 36 and 38 connected in the transfer loops are used for "zero suppression" purposes as indicated above. In presently available magnetic materials the hysteresis loop deviates somewhat from the ideal rectangular shape assumed herein. Accordingly, when a core is driven further into saturation by a pulse some small flux change is produced. This small flux change induces a small noise voltage across the terminals of each winding. In the case of the negative shift pulse 56, for example, the marked terminal of a transfer winding of a core already magnetized in the N direction is made slightly more positive than its unmarked terminal by this induced noise voltage. However, substantially no current flow is produced in a transfer loop by this small voltage because of the manner of connecting the batteries 36 and 38, with their negative terminals connected to the unmarked terminals of the respective transfer windings 16. The size of the batteries 36 and 38 is made approximately equal to the induced noise voltage produced by the cores used in practicing the invention. Thus, any small noise voltage is not of sufficient amplitude to force a current through either one of the batteries 36 and 38. Note that the batteries 36 and 38 are not essential to practicing the invention. If substantially rectangular hysteresis loop materials are used, there would be substantially little noise voltage induced in a transfer winding when a core is driven further into saturation. Also, faster operation can be achieved by using batteries for zero suppression when the materials employed exhibit hysteresis loops which deviate somewhat from a rectangular characteristic. Faster operation can be obtained because switching pulses having relatively fast rise times and relatively short durations can be employed. The increased noise voltage produced by the leading edge of a shift pulse is suppressed by the D.C. batteries.

There have been described herein improved magnetic core circuits requiring but two windings per core. By providing a pair of transfer loops connecting the transfer windings of adjacent cores, information is shifted from one core to the next succeeding core in a desired manner. The output of the last stage can be applied across a pair of output terminals to form an open-ended shift register and counting type circuits; the output of the last stage can also be fed back to the input of the first stage to form a ring counter type circuit.

In case it is desired to have a shift register type circuit with an odd number of stages, an additional output winding may be linked to the last odd stage core for furnishing an output signal. The additional winding may be used because the voltage at the marked terminal of an odd core transfer winding 16 includes two different components. One component is due to the voltage at the point E, and the other component is due to the voltage developed across the transfer winding 16 of an odd core. In order to separate the latter component from the first component, the additional output winding may be linked to an odd core. In such case, the voltage developed across the output winding terminals represents only the component due to the voltage developed across the odd stage core 12 transfer winding 16.

What is claimed is:

1. A magnetic shift register comprising a plurality of magnetic cores each having two residual directions of appreciable magnetization, and each of said cores being linked by a first and a second winding, pairs of transfer loops connecting the first windings of said cores for transferring an electrical signal from the first winding of one of said cores to the first winding of a succeeding core in a shifting sequence, a separate temporary storage means common to each separate pair of said transfer loops, a unidirectional conducting means connected in each transfer loop for preventing undesired currents from flowing in said transfer loops, said unidirectional conducting means of successive pairs of said transfer loops being poled in opposite directions, means for applying a shift pulse to said second windings for changing the direction of magnetization of said cores, and means for biasing said unidirectional conducting means of one transfer loop of each pair to cut-off during the presence of said shift pulse.

2. In a magnetic shift register, the combination comprising a plurality of successive magnetic cores each capable of assuming two stable remanent conditions, each said core being linked by a separate one of a plurality of transfer windings, said transfer windings respectively having terminals; means including pairs of unidirectional conducting means respectively connecting one of said terminals of said transfer windings of successive cores, successive pairs of said unidirectional conducting means being oppositely poled; a plurality of temporary storage means, a different one of said temporary storage means being connected at a junction between each pair of unidirectional conducting means; and a pair of bias sources connected respectively to bias both said unidirectional conducting means of said pairs of transfer loops in directions opposite their directions of easy current flow.

3. A magnetic system comprising a plurality of magnetic cores each capable of assuming two stable remanent conditions, a first winding on each of said cores for both transferring information into and out of said cores, pairs of transfer loops connecting the cores in cascade by connecting the first winding of one of said cores to the first winding of a succeeding core, a different temporary storage means common to each pair of transfer loops for storing information transferred from a preceding core, a different unidirectional conducting means connected in each transfer loop and poled to prevent information from being transferred in one direction, and a common bias means connected to one of said unidirectional conducting means of one transfer loop of each pair and effective during operation to bias said connected unidirectional conducting means to cut-off when information is transferred from said cores to said temporary storage means.

4. A magnetic system comprising a plurality of magnetic cores each capable of assuming two stable remanent conditions, a first winding on each of said cores, pairs of transfer loops connecting the cores in cascade by connecting a first transfer loop of a pair to said first winding on one core and the second transfer loop of a pair to said first winding on the core next succeeding the one core, a different temporary storage means common to each pair of transfer loops for storing information transferred from a preceding core, a unidirectional conducting means connected in each transfer loop to prevent information from being transferred from a succeeding core to a preceding core, said unidirectional conducting means of successive pairs of said transfer loops being poled in opposite directions, and a common bias means connected to the unidirectional conducting means of each second transfer loop and effective during operation to bias each connected unidirectional conducting means to cut-off when information is being transferred from said cores to said temporary storage means.

5. A magnetic system comprising a plurality of magnetic cores each capable of assuming two stable remanent conditions, a first winding on each of said cores, pairs of transfer loops connecting the cores in cascade by connecting a first transfer loop of a pair to said first winding on one core and the second transfer loop of a pair to said first winding on the core next succeeding the one core, a different temporary storage means common to each pair of transfer loops for storing information transferred from a preceding core, a unidirectional conducting means connected in each transfer loop to prevent information from being transferred from a succeeding core to a preceding core, said unidirectional conducting means of successive pairs of said transfer loops being poled in opposite directions, a common bias means connected to the unidirectional conducting means of each second transfer loop and effective during operation to bias each connected unidirectional conducting means to cut-off when information is being transferred from said cores to said temporary storage means, and a common constant voltage source connected in each first transfer loop and poled to prevent noise signals generated by said cores from producing a current in said transfer loops.

6. A magnetic shift register comprising a plurality of magnetic cores each having two residual directions of appreciable magnetization, a shift coil linked to each of said cores, a plurality of transfer windings, a separate one of said transfer windings linking a different one of said cores, said transfer windings having first and second terminals, respectively, means including pairs of unidirectional conducting means successively and alternatingly connecting said first and second terminals of said transfer windings of successive ones of said cores, successive pairs of said unidirectional conducting means being oppositely poled, a plurality of temporary storage means one connected at a junction between each pair of unidirectional conducting means, first and second bias means connected respectively to bias said unidirectional conducting means in each said pair of transfer loops in the directions opposite their directions of easy current flow, means connecting the remaining second terminals of said transfer windings and alternate ones of said temporary storage means to said first bias means, means connecting the remaining first terminals of the transfer windings of the remaining cores and the remaining temporary storage means to said second bias means, and means for applying a shift pulse to said shift coil for changing the direction of magnetization of said cores to a predetermined direction, said shift pulse being simultaneously applied to said second bias means.

7. A magnetic system comprising at least three magnetic cores each capable of assuming two stable remanent conditions, a first winding on each of said cores for transferring information into and out of said cores, pairs of transfer loops connecting the cores in cascade by connecting the first windings of one of said cores to the first winding of the core next succeeding said one core, and so on, a second winding on each of said cores for shifting information from said one core to a succeeding core, a different temporary storage means common to each pair of transfer loops for storing information transferred from a preceding core, a different unidirectional conducting means connected in each transfer loop and poled to prevent information from being transferred in an undesired direction, said unidirectional conducting means of successive pairs of said transfer loops being poled in opposite directions, a common bias means connected to one of said unidirectional conducting means of one transfer loop of each pair and effective during operation to bias said connected unidirectional conducting means to cut-off when information is transferred from said cores to said temporary storage means, and means for applying a signal simultaneously to said second windings and said common bias means.

8. A magnetic system comprising a plurality of magnetic cores each capable of assuming two stable remanent conditions, a first winding on each of said cores for both transferring information into and out of said cores, pairs of transfer loops connecting the cores in sequence by connecting the first winding of a lower order core to the first winding of a higher order core, a different temporary storage means common to each pair of transfer loops for storing information transferred from a lower order core, a different unidirectional conducting means connected in each transfer loop and poled to prevent information from being transferred from a said higher order core to a said lower order core, said unidirectional conducting means of successive pairs of said transfer loops being poled in opposite directions, and a common bias means connected to one of said unidirectional conducting means of one transfer loop of each pair and effective during operation to bias said connected unidirectional conducting means to cut-off when information is transferred from said cores to said temporary storage means.

9. A magnetic system comprising a plurality of magnetic cores each capable of assuming two stable remanent conditions, a first winding on each of said cores for both transferring information into and out of said cores, pairs of transfer loops connecting the cores in sequence by connecting the first winding of a lower order core to the first winding of a higher order core, and including a pair of transfer loops connecting the first winding of the highest order core to the first winding of the lowest order core, a different temporary storage means common to each pair of transfer loops for storing information transferred from a lower order core, a different unidirectional conducting means connected in each transfer loop and poled to prevent information from being transferred from a said higher order core to a said lower order core, successive pairs of said transfer loops having their unidirectional conducting means poled in opposite directions, and a common bias means connected to one of said unidirectional conducting means of one transfer loop of each pair and effective during operation to bias said connected unidirectional conducting means to cut-off when information is transferred from said cores to said temporary storage means.

10. In a magnetic shift register, the combination as claimed in claim 2, including a shift coil linked to said cores and means for applying a shift pulse to said shift coil for changing the direction of magnetization of said cores, said one terminal of alternate ones of said transfer windings of said cores assuming opposite polarities when said shift pulse is applied.

11. In a magnetic system, the combination comprising at least two magnetic cores each capable of assuming two stable remanent conditions, a plurality of transfer windings, each of said cores being linked by an indivdual one of said transfer windings, said transfer windings each operating as both input and output windings, first and second transfer loops coupling the transfer winding of a first of said cores to the transfer winding of a second of said cores, each of said transfer loops including a separate unidirectional conducting means, a temporary storage device common to said first and second transfer loops, and first and second bias source connected respectively to bias said unidirectional conducting means in directions opposite their directions of easy current flow.

12. A magnetic shift register comprising a plurality of magnetic cores each capable of assuming two stable remanent conditions, each linked by a separate one of a plurality of transfer windings having terminals, a plurality of pairs of unidirectional conducting means connected in series with each other, both unidirectional conducting means of a pair being poled in the same direction and successive pairs of said unidirectional conducting means being poled in opposite directions, each transfer winding being connected at one terminal to a junction between each different pair of said unidirectional conducting means, a plurality of temporary storage means, a different one being connected at a junction between each said pair of unidirectional conducting means, a pair of bias sources connected respectively to bias both said unidirectional conducting means of said pairs in the directions opposite their directions of easy current flow, alternate ones of said temporary storage means being connected to said first bias source, the remaining ones of said temporary storage means being connected to said second bias source.

References Cited in the file of this patent

UNITED STATES PATENTS

| | | |
|---|---|---|
| 2,652,501 | Wilson | Sept. 15, 1953 |
| 2,753,545 | Lund | July 3, 1956 |
| 2,758,221 | Williams | Aug. 7, 1956 |
| 2,825,890 | Ridler et al. | Mar. 4, 1958 |
| 2,883,648 | Rubinstein et al. | Apr. 21, 1959 |

FOREIGN PATENTS

| | | |
|---|---|---|
| 730,165 | Great Britain | May 18, 1955 |

OTHER REFERENCES

1953 IRE National Convention Record, March 23–26, 1953, pages 38 to 42.